United States Patent Office 3,784,593
Patented Jan. 8, 1974

3,784,593
PROCESS FOR CLASS IV–B METALS ORE
REDUCTION (IMPROVEMENT)
Paul Franklin Taylor, P.O. Box 468,
Crossville, Tenn. 38555
No Drawing. Continuation-in-part of application Ser. No. 117,098, Feb. 19, 1971. This application Mar. 22, 1972, Ser. No. 236,961
Int. Cl. C22b 53/00, 61/02
U.S. Cl. 75—84      12 Claims

ABSTRACT OF THE DISCLOSURE

Ores containing oxides of titanium, zirconium, and hafnium are reduced by mixing them with a solution containing primarily phosphoric acid as well as zinc oxide and a sulfated surfactant. Calcium carbonate is added to the solution and it is brought to a boil, allowing the volatile materials to vaporize to form a syrupy mixture. Optionally, sodium bicarbonate and water are added and the resultant mixture is decanted. The resulting material is leached and dried. The residue is immersed in molten sodium hydroxide, diluted with water, rinsed, re-dried, and smelted to yield the pure metal.

---

This application is a continuation-in-part of copending application Ser. No. 117,098, filed Feb. 19, 1971.

The present invention relates to an improved method of separating the Class IV–B metals from chemically combined oxygen; more specifically termed reduction of the oxides in which the metals exist as parts; such separating herein known as Class IV–B Metals Ore Reduction Improvement. More specifically it is an improvement over that state of the art as taught by Paul Franklin Taylor for Class IV–B Metals Ore Reduction on the copending application.

The ore reduction solution formula specified within the copending application includes water (chemically $H_2O$) as a component part. The present invention improvement requires the same and exact solution formula components and ratios by weight as those previous with the sole exception of the usage of water ($H_2O$) as a component of that formula.

As starting materials for this improved process; powdered or pulverized Class IV–B metal ore is mixed with the herein described concentrated liquid chemical solution formula, and powdered or pulverized calcium carbonate ($CaCO_3$) is added as a catalyst. The ore is either of the following types: rutile, and the titanium ore product (titanium dioxide, $TiO_2$) as may be extracted from ilmenite ore; baddeleyite and the like, zirconium ore product (zirconium dioxide, $ZrO_2$) as may be extracted from zirconia silicate; hafnium ore as included in and a part of the zirconium ore (and is chemically $HfO_2$). The concentrated liquid chemical solution formula is of composition and weight ratio as follows:

Phosphoric acid—24.20 # more or less
Zinc oxide—0.50 # more or less
Sulfated surfactant—1.00 # more or less The sulfated surfactant is a type of wetting agent and of composition alkylphenol polyglycol ether. The powdered calcium carbonate ($CaCO_3$) should be at least 99% pure.

When the selected ore and other starting materials are mixed together within a common container and heated with endothermic heat, gases (including oxygen) are volatilized from the solution, thereby creating deficiencies of that element within certain of the solution components, which creates deoxidized and dehydrated effects of those components, and by such action the evolution of the element oxygen from the ores.

It is, therefore, an object of the present invention improvement to provide another method for the reduction of Class IV–B metals, by the main feature of usage of the concentrated liquid formula solution instead of the previous water-diluted solution.

It is a further object of the present invention improvement to provide a much simpler and more economical method for the reduction of those metals than that afforded in the stated previous application, by usage of the concentrated liquid formula solution instead of the previous water-diluted solution.

Other objects and advantages of the present invention improvement will become apparent from a further reading of the description and the appended claims.

With the above and other objects in view, the present invention improvement mainly comprises in another process for separating the Class IV–B metals from the chemically combined element oxygen; featuring greater ease of reduction operations, production of high grade metal, and one that is more economically advantageous than that afforded in the stated previous application, by usage of the concentrated liquid formula solution instead of the stated previous water-diluted solution.

The process begins with the stated mixing together of the starting materials in a suitable pot or vat, followed by agitating until the visible chemical reaction is completed, and the mixture is homogeneous and blended.

The pot or vat then operates within proximity of a suitable furnace arrangement where effective heat may be applied to it.

The solution with the ore and catalyst is then boiled with heat until sufficient liquid and certain other elements have volatilized and escaped from the pot or vat as flue gases. The boiling is attended and enhanced by frequent stirrings with a suitable agitator. It is also attended by such mechanical arrangement as necessary for collecting and venting of the flue gases.

The temperature operation range throughout the boiling period is that which is necessary for maintaining a very gentle boil. Heating may be terminated while residue is yet pliable, or continued until residue is baked hard, as the operator may choose.

If the choice is for a pliable residue, heat being terminated, sufficient time for cooling is allowed and then sodium compounds are added to the metal residue at the bottom of the pot or vat, followed by stirring and additions of water. Certain unwanted chemicals and dross will react with the sodium water, go into solution, and then may be decanted off.

With sufficient water rinsing of the residue metal powder will result, free from these chemical wastes.

Metal powder may then be subjected to further cleansing with certain cleansing and leaching agents as selected by the operator, conventional, and for further removal of unwanted contaminants. These agents may be acids, detergents, hydrocarbon solutions, etc.

After sufficient cleansing and leaching, powder is then dried in such manner so that it will not re-oxidize with component gases of the atmosphere, which effect may be both hazardous, and result in a spoiled product.

The reduced, cleansed, and dried powder may then be smelted to refined powder, or to ingot form, by conventional furnace mechanisms and techniques (which are not a part of this application for ore reduction), suitable for production of Class IV-B metal utilizing the resultant product from this reduction process. Or, at this stage it may be brought into a more commercially pure grade powder state (without smelting) by further cleansing and leaching upon immersion in molten alkali bases, followed by flushing with water and re-drying as above stated. It may then be utilized commercially as is or melted as above stated.

If the choice is for a hard baked residue, heat being terminated, sufficient time for cooling is allowed and then residue is removed from pot or vat.

Residue may then be transported through a grinding, sifting and grading operation. It may then be smelted to refined powder, or to ingot form, by conventional furnace mechanisms and techniques (which are not a part of this application for ore reduction), suitable for production of Class IV-B metal utilizing the resultant product from this reduction process. Or, at this stage it may be brought into a more commercially pure grade powder state (without smelting) by further cleaning and leaching upon immersion in molten alkali bases, followed by flushing with water and dried with the same care as described above. It may then be utilized commercially as is or smelted as above stated.

Thus, from either the pliable or hard baked residue commercially pure grade powder and ingot may be the resultant form of Class IV-B metal produced by the instant reduction improvement process herein stated and claimed, and upon proper smelting and refinement of same.

OPERATIONAL EXAMPLE 1.—FOR TITANIUM METAL ORE REDUCTION

The operation for titanium metal ore reduction as derived from the foregoing specification may be exemplified more particularly by an explanation for the reduction of a 17-pound batch of titanium ore ($TiO_2$), which the inventor has operated successfully. Examples of other batch volumes will not herein be given for titanium ore because inventor has reduced various batch volumes and found the ratios of all materials used for them remain in the same proportion as the given example.

The reduction equipment consists of the same as that used in the previous parent application (Class IV-B Metals Ore Reduction, Ser. No. 117,098, filed Feb. 19, 1971).

Introduced within the pot are 13 pounds (approximately one U.S. gallon) liquid concentrated chemical solution called Taylor formula; such solution being comprised of ingredients as described in the above specification. In addition to it's wetting qualities this formula also has the property of forming passivated coatings on metallic surfaces, thereby preventing oxidation; and may (as is applied in this process) accomplish reduction of the metallic ores, provided the solution is deoxidized and dehydrated—which it is here caused to be by boiling and the consequent volatilizing of the elements oxygen and water.

To the solution is added 17 pounds (approximately one U.S. gallon) of titanium ore ($TiO_2$), ground to $-325$ mesh.

Good stirring of the mixture at this time permits saturation by the solution of all the ore particles within the batch.

Thus, the ratio by weight for this batch (and all other various and possible batches) is 13 pounds concentrated Taylor formula solution to 17 pounds of ore (or approximately one U.S. gallon of formula to one U.S. gallon of $-325$ mesh titanium ore).

To this mixture is added ½ pound (approximately 1 cup) of limestone of approximately $-100$ mesh. This type is at least 99% pure calcium carbonate ($CaCO_3$).

The mixture is again stirred vigorously to aid limestone in entering the solution completely, with the chemical reaction result being the release of carbon dioxide ($CO_2$) gas. The resulting lime (CaO) enters the solution as a catalyst agent supporting reduction of the metallic oxides when the solution later begins to be deoxidized and dehydrated by volatilizing (boiling).

When mixing is completed and the reaction has terminated, with pot resting within the furnace, heat is applied from the double burner below (which is gas fired) until boiling is attained.

Stirring is necessary at this time to prevent a caking effect, and it is noted that the solution with the ore at the bottom becomes a more homogeneous mixture as the particles begin to swirl within the solution as it boils.

The gas burners are lowered at this time to maintain a very gentle boil and the flue gas collector hood-cover is positioned over the pot. Throughout the entire boiling operation the hoodcover is kept closed as much as possible (notwithstanding stirring) to allow least amounts of fume discomfort to the operator.

The boiling continues for approximately three-fourths hour with three or four stirring at intervals during this period.

Burners are shut off when it is observed that the material has turned blackish in color, reached a thick syrupy viscosity, and while it is yet pliable. Or, at this point the operator may elect to continue boiling until residue is baked hard.

If the election is for a pliable and syrupy residue, approximately fifteen minutes of cooling time is allowed. Then the hoodcover is raised and two pounds of bicarbonate of soda ($NaHCO_3$) is sprinkled on top of the residue, followed by approximately five gallons of water, and with the pot removed from the furnace.

A reaction is most visible. With some stirring and reaction terminated the mixture is allowed to settle out. Liquid is then decanted, being careful that powder is not lost. Residue powder is then flushed with warm water until it is colorless with no visible signs of dross, or other impurities. It may then be reacted with acids (such as hydrochloric), or other cleansing and leaching agents, followed by warm water rinsings until sufficient impurities are out of the residue powder.

The titanium powder is then carefully and thoroughly dried in the pot by refiring the gas burners, at which time the reduction process is terminated and the burners are shut off. Care must be exercised that excessive heat is not applied to the drying powder, otherwise powder will become reoxidized by atmospheric gases and be returned to it's original state ($TiO_2$), and consequently spoiled.

At this stage the powder may be transported to refinement operations (which are not a part of this application) for smelting and refining to commercially pure grade titanium powder, or ingot form. Or, at this stage it may be used in the commercial metallizing industry (base metal coatings). Or, if further cleansing and leaching of the powder is necessary by the operator at this stage it may be immersed in molten sodium hydroxide for approximately thirty minutes in the ratio of approximately ten pounds of dried powder to approximately twenty pounds of the hydroxide (or ratio 1:2), followed by sufficient cool (then warm) water rinse until resultant powder is sufficiently cleansed. Powder may then be re-dried as described above for smelting and/or refining to commercially pure grade titanium powder, or ingot form. Or, at this stage it may be used in the commercial metalizing industry.

If the election of the operator is for a hard-baked residue, approximately fifteen minutes of cooling time is allowed, and the hood-cover is raised and the pot removed from the furnace. The residue is then removed from the pot and may be transported through a crushing and grinding operation; reduced by attrition to approximately −50 to −200 mesh grade. It may then be transported to refinement operations for smelting and/or refining to commercially pure grade titanium powder, or ingot form. Or, if further cleansing and leaching of the powder is necessary by the operator at this stage it may be immersed in molten sodium hydroxide for approximately one hour, in the ratio of approximately ten pounds of powder to approximately twenty pounds of the hydroxide (or ratio 1:2), followed by sufficient cool (then warm) water rinses until resultant powder is sufficiently cleansed. Powder may then be dried as described above and transported to refinement operations for smelting and refining to commercially pure grade titanium powder, or ingot form. Or, at this stage it may be used in the commercial metallizing industry.

The calcium carbonate ($CaCO_3$) ratio for all various and possible batches is determined by the usage of ½ pound limestone of approximately −100 mesh, per 17 pounds (or approximately 1 U.S. gallon) of titanium ore sized −80 through −400 mesh.

The sodium bicarbonate ($NaHCO_3$) ratio (for flushing after the boiling period) is determined for all various and possible batches by the usage of 2 pounds per 13 pounds (or approximately 1 U.S. gallon) of liquid concentrated chemical solution for the reduction operations.

OPERATIONAL EXAMPLE 2.—FOR ZIRCONIUM AND HAFNIUM METAL ORE REDUCTION

The operation for zirconium and hafnium metal ore reduction as derived from the foregoing specification may be exemplified more particularly by an explanation for the reduction of a 25-pound batch of zirconium ore ($ZrO_2$), which includes small amounts (1%–5%) of hafnium ore ($HfO_2$), which the inventor has operated successfully. Examples of other batch volumes will not herein be given for zirconium ore because inventor has reduced various batch volumes and found the ratios of all materials used for them remain in the same proportion as the herein given example.

The reduciton equipment consists of the same as that used for Operational Example 1 for titanium ore reduction.

Introduced within the pot are 13 pounds (approximately one U.S. gallon) liquid concentrated chemical solution called Taylor formula; such solution being comprised of ingredients as described in the above specification, and as that used in Operational Example 1.

To this solution is added 25 pounds (approximately 1 U.S. gallon) of zirconium-hafnium ore ($ZrO_2$–$HfO_2$), ground to −325 mesh.

Good stirring of the mixture at this time permits saturation by the solution of all the ore particles within the batch.

Thus, the ratio by weight for this batch (and all other batches) is 13 pounds concentrated Taylor formula solution to 25 pounds of ore (or approximately one U.S. gallon formula to one U.S. gallon ore).

To this mixture is added ½ pound (1 cup approximately) limestone of approximately −100 mesh grade. This type is at least 99% pure calcium carbonate ($CaCO_3$).

The mixture is again stirred vigorously to aid limestone in entering the solution completely, with the chemical reaction result being the release of carbon dioxide ($CO_2$) gas. The resulting lime (CaO) enters the solution as a catalyst agent supporting reduction of the metallic oxides when the solution later begins to be deoxidized and dehydrated by volatilizing (boiling).

When mixing is completed and the reaction has terminated, with pot resting within the furnace, heat is applied from the double burner below (which is gas fired) until boiling is attained.

Stirring is necessary at this time to prevent a caking effect, and it is noted that the solution with the ore at the bottom becomes a more homogeneous mixture as the particles begin to swirl within the solution as it boils.

The gas burners are lowered at this time to maintain a very gentle boil and the flue gas collector hood-cover is positioned over the pot. Throughout the entire boiling operation the hood-cover is kept closed as much as possible (notwithstanding stirring) to allow least amounts of fume discomfort to the operator.

The boiling continues for approximately three-fourths hour with three or four stirrings at intervals during this period.

Burners are shut off when it is observed that the material has turned blackish in color, reached a thick syrupy viscosity, and while it is yet pliable. Or, at this point the operator may elect to continue boiling until residue is baked hard.

If the election is for a pliable and syrupy residue, approximately fifteen minutes of cooling time is allowed. Then the hood-cover is raised and two pounds of bicarbonate of soda ($NaHCO_3$) is sprinkled on top of the residue, followed by approximately five gallons of water, and with the pot removed from the furnace.

A reaction is most visible. With some stirring and the reaction terminated the mixture is allowed to settle out. Liquid is then decanted being careful that powder is not lost. Residue powder is then flushed with warm water until it is colorless with no visible signs of dross, or other impurities. It may then be reacted with acids (such as hydrochloric), or other cleansing and leaching agents, followed by warm water rinsings until sufficient impurities are out of the residue powder.

The zirconium-hafnium powder is then carefully and thoroughly dried in the pot by refiring the gas burners, at which time the reduction process is terminated and the burners are shut off. Care must be exercised that excessive heat is not applied to the drying powder, otherwise powder will become reoxidized by atmospheric gases and be returned to it's original state ($ZrO_2$), and consequently spoiled.

At this stage the powder may be transported to refinement operations (which are not a part of this application) for smelting and refining to commercially pure grade zirconium-hafnium powder, or ingot form. Or, at this stage it may be used in the commercial metallizing industry (base metal coatings). Or, if further cleansing and leaching of the powder is necessary by the operator at this stage it may be immersed in molten sodium hydroxide for approximately thirty minutes, in the ratio of approximately 15 pounds of dried powder to approximately twenty pounds of the hydroxide (or ratio 3:4), followed by sufficient cool (then warm) water rinsings until resultant powder is sufficiently cleansed. Powder may then be redried as described above for smelting and refining to commercially pure grade zirconium-hafnium powder, or ingot form. Or, at this stage it may be used in the commercial metallizing industry.

If the election of the operator is for a hard-baked residue, approximately fifteen minutes of cooling time is allowed, and the hood-cover is raised and the pot removed from the furnace. The residue is then removed from the pot and may be transported through a crushing and grinding operation; reduced by attrition to approximately −50 to −200 mesh grade. It may then be transported to refinement operations for smelting and refining to commercially pure grade zirconium-hafnium powder, or ingot form. Or, if further cleansing and leaching of the powder is necessary by the operator at this stage it may be immersed in molten sodium hydroxide for approximately one hour, in the ratio of approximately fifteen pounds of powder to approximately twenty pounds of the hydroxide (or ratio 3:4), followed by sufficient cool (then warm) water rinsings until resultant powder is sufficiently cleansed. Powder may then be dried as described above and transported to refinement operations for smelting and refining to commercially pure grade zirconium-hafnium powder, or ingot form. Or, at this stage it may be used in the commercial metallizing industry.

The calcium carbonate ($CaCO_3$) ratio for the various and possible batches is determined by the usage of ½ pound limestone of approximately −100 mesh, per 25 pounds (or approximately 1 U.S. gallon) of zirconium-hafnium ore sized −80 through −400 mesh.

The sodium bicarbonate ($NaHCO_3$) ratio (for flushing after the boiling period) is determined for all various and possible batches by the usage of 2 pounds per 13 pounds (or approximately 1 U.S. gallon) of liquid concentrated chemical solution for the reduction operations.

Flushing water and other cleansing and leaching agents may have ratios for all various and possible batches in like proportion as used in the above examples (1 and 2).

Boiling and cooling periods for all various and possible batch sizes may only be determined by the operator depending upon his particular geographical location of operation. Parameters for those determinations may be indicated by the above examples (1 and 2); the operations being performed at a geographical location of 2000 feet elevation above sea level, with atmospheric temperatures normally ranging between 40° F. and 80° F. With respect to such factors as atmospheric temperatures, atmospheric pressures and altitudes, atmospheric humidity, fuels and oxidizers used (for furnace operations), vertical and lateral dimensions of reduction equipment used, etc., clear-cut and definite statements cannot be made herein as to the standard procedures in regard thereto for all various and possible batch sizes.

CLASS IV–B METALS ORE REDUCTION IMPROVEMENT CHEMISTRY

The discussion of the chemistry involved in the above specification and examples (1 and 2) compare to that given in the original parent application for Class IV–B Metals Ore Reduction, Ser. No. 117,098, filed Feb. 19, 1971, and needs not be repeated herein or added to.

What is claimed as new and desired to be secured by Letters Patent is:

1. A method of reducing titanium dioxide to titanium comprising the steps of:
   (A) Adding powdered titanium dioxide to a solution consisting essentially of about 24.2 parts by weight of phosphoric acid, about 0.5 part by weight of zinc oxide, and about 1 part by weight of a sulfated surfactant,
   (B) Dissolving ½ pound of calcium carbonate to every 17 pounds of titanium dioxide,
   (C) Bringing the solution to a boil while agitating to obtain a homogenous solution,
   (D) Vaporizing the volatile materials until residue is syrupy (pliable),
   (E) Adding 2 pounds of sodium bicarbonate to every 13 pounds of liquid formula used,
   (F) Adding water,
   (G) Decanting the resulting solution after the reaction has gone to completion,
   (H) Leaching the material in acids and water,
   (I) Drying the resultant residue,
   (J) Immersion of the material in molten sodium hydroxide in the ratio of about one part of the material by weight to about two parts of the hydroxide by weight, cooling, and
   (K) Diluting with water and rinsing with same,
   (L) Decanting the resulting solution,
   (M) Re-drying the resultant residue, and
   (N) Smelting the remaining material to produce titanium metal.

2. The process of claim 1 wherein the titanium dioxide is in the form of a rutile, and the titanium product as derived from ilmenite ore.

3. The process of claim 1 wherein sulfated surfactant is an alkylphenol polyglycol ether.

4. A method of reducing titanium dioxide to titanium comprising the steps of:
   (A) Adding powdered titanium dioxide to a solution consisting essentially of about 24.2 parts by weight of phosphoric acid, about 0.5 part by weight of zinc oxide, and about 1 part by weight of a sulfated surfactant,
   (B) Dissolving ½ pound of calcium carbonate to every 17 pounds of titanium dioxide,
   (C) Bringing the solution to a boil while agitating to obtain a homogenous solution,
   (D) Vaporizing the volatile materials until residue is hard,
   (E) Removing residue and pulverizing,
   (F) Leaching and reacting residue by immersion in molten sodium hydroxide in the ratio of about one part of the material by weight to about two parts of the hydroxide by weight, cooling, and
   (G) Diluting with water and rinsing with same,
   (H) Decanting the resulting solution,
   (I) Drying the resultant residue, and
   (J) Smelting the remaining material to produce titanium metal.

5. The process of claim 4 wherein the titanium dioxide is in the form of rutile, and the titanium product as derived from ilmenite ore.

6. The process of claim 4 wherein sulfated surfactant is an alkylphenol polyglycol ether.

7. A method of reducing zirconium dioxide to zirconium and hafnium comprising the steps of:
   (A) Adding powdered zirconium dioxide to a solution consisting essentially of about 24.2 parts by weight of phosphoric acid, about 0.5 part by weight of zinc oxide, and about 1 part by weight of a sulfated surfactant,
   (B) Dissolving ½ pound of calcium carbonate to every 25 pounds of zirconium dioxide,
   (C) Bringing the solution to a boil while agitating to obtain a homogenous solution,
   (D) Vaporizing the volatile materials until residue is syrupy (pliable),
   (E) Adding 2 pounds of sodium bicarbonate to every 13 pounds of liquid formula used,
   (F) Adding water,
   (G) Decanting the resulting solution after the reaction has gone to completion,
   (H) Leaching the material in acids and water,
   (I) Drying the resultant residue,
   (J) Immersion of the material in molten sodium hydroxide in the ratio of about 3 parts of the material by weight to about 4 parts of the hydroxide by weight, cooling, and
   (K) Diluting with water and rinsing with same,
   (L) Decanting the resulting solution,
   (M) Re-drying the resultant residue, and
   (N) Smelting the remaining material to produce zirconium and hafnium metal.

8. The process of claim 7 wherein the zirconium dioxide is in the form of baddeleyite, and the zirconium product as derived from zirconium silicate.

9. The process of claim 7 wherein sulfated surfactant is an alkylphenol polyglycol ether.

10. A method of reducing zirconium dioxide to zirconium and hafnium comprising the steps of:
    (A) Adding powdered zirconium dioxide to a solution consisting essentially of about 24.2 parts by weight of phosphoric acid, about 0.5 part by weight of zinc oxide, and about 1 part by weight of a sulfated surfactant,
    (B) Dissolving ½ pound of calcium carbonate to every 25 pounds of zirconium dioxide,
    (C) Bringing the solution to a boil while agitating to obtain a homogenous solution,
    (D) Vaporizing the volatile materials until residue is hard, (E) Removing residue and pulverizing,
(F) Leaching and reacting residue by immersion in molten sodium hydroxide in the ratio of about 3 parts of the material by weight to about 4 parts of the hydroxide by weight, cooling, and
(G) Diluting with water and rinsing with same,
(H) Decanting the resulting solution,
(I) Drying the resultant residue, and
(J) Smelting the remaining material to produce zirconium and hafnium metal.

11. The process of claim 10 wherein the zirconium dioxide is in the form of baddeleyite, and the zirconium product as derived from zirconium silicate.

12. The process of claim 10 wherein sulfated surfactant is an alkylphenol polyglycol ether.

References Cited

UNITED STATES PATENTS

| | | | |
|---|---|---|---|
| 1,796,170 | 3/1931 | Terwilliger | 23—19 |
| 1,593,660 | 7/1926 | Lubowsky | 75—84 |
| 2,617,724 | 11/1952 | Espenschied | 75—121 |
| 2,697,660 | 12/1954 | Sibert | 75—121 |
| 2,939,786 | 6/1960 | Ginsberg et al. | 75—84 |

BENJAMIN R. PADGETT, Primary Examiner

B. HUNT, Assistant Examiner

U.S. Cl. X.R.

75—97 R, 108